(12) United States Patent
Franz et al.

(10) Patent No.: US 11,337,431 B2
(45) Date of Patent: May 24, 2022

(54) CASING HOLDING DEVICE FOR AN APPARATUS FOR FILLING TUBULAR CASES

(71) Applicant: VEMAG MASCHINENBAU GMBH, Verden (DE)

(72) Inventors: Gerhard Franz, Langwedel (DE); Klaus Hiller, Dörverden (DE); Johann Walger, Langwedel (DE)

(73) Assignee: Vemag Maschinenbau GmbH, Verden (DE)

( * ) Notice: Subject to any disclaimer, the term of this patent is extended or adjusted under 35 U.S.C. 154(b) by 60 days.

(21) Appl. No.: 17/064,200

(22) Filed: Oct. 6, 2020

(65) Prior Publication Data
US 2021/0127690 A1  May 6, 2021

(30) Foreign Application Priority Data
Nov. 6, 2019  (DE) .......................... 202019106178.2

(51) Int. Cl.
*A22C 11/00* (2006.01)
*A22C 11/02* (2006.01)
(Continued)

(52) U.S. Cl.
CPC .......... *A22C 11/0263* (2013.01); *A22C 11/04* (2013.01); *F16H 21/44* (2013.01); *G05G 1/04* (2013.01)

(58) Field of Classification Search
CPC . A22C 11/0263; A22C 11/04; A22C 11/0209; G05G 1/04; F16H 21/44
(Continued)

(56) References Cited

U.S. PATENT DOCUMENTS 4,744,129 A    5/1988  Weerth
4,837,896 A *  6/1989  Lockard ............. A22C 11/0263
                                                         452/38
(Continued)

FOREIGN PATENT DOCUMENTS

DE    102008031019 A1    12/2009
EP       0232812 A1       8/1987
(Continued)

OTHER PUBLICATIONS

German Patent and Trade Mark Office, Search Report issued in Application No. 202019106178.2 dated Apr. 6, 2020.
(Continued)

*Primary Examiner* — Richard T Price, Jr.
(74) *Attorney, Agent, or Firm* — Thompson Hine LLP (57) ABSTRACT

Casing holding device for filling tubular cases with a pasty foodstuff material. A casing brake, in a portioning position, is in contact with a case drawn on to a filling tube and produces a pressing force between case and filling tube. An adjusting device is configured for moving the casing brake between the portioning position and a casing change position in which the casing brake is uncoupled from the filling tube. The adjusting device has a guide linkage which has a plurality of links and which is adapted for the casing brake in at least a first phase of the movement out of the portioning position into the casing change position to be moved substantially axially relative to the longitudinal axis of the filling tube and to be pivoted in at least a second phase of the movement relative to the longitudinal axis of the filling tube.

18 Claims, 4 Drawing Sheets

(51) Int. Cl.
*A22C 11/04* (2006.01)
*F16H 21/44* (2006.01)
*G05G 1/04* (2006.01)

(58) Field of Classification Search
USPC .......................................................... 452/41
See application file for complete search history.

(56) References Cited

U.S. PATENT DOCUMENTS

| | | |
|---|---|---|
| 8,100,355 B2 | 1/2012 | Hagedorn |
| 8,277,293 B2 | 10/2012 | Maile et al. |
| 8,956,204 B2 * | 2/2015 | Niedecker .......... A22C 11/0263 452/32 |

FOREIGN PATENT DOCUMENTS

| | | |
|---|---|---|
| EP | 2100513 A1 | 9/2009 |
| EP | 2227963 A1 | 9/2010 |

OTHER PUBLICATIONS

European Patent Office, Search Report issued in European Patent Application No. 20 19 1591 dated Feb. 10, 2021.
European Patent Office, Examination Report and Written Opinion (with English translation) issued in European Patent Application No. 20191591.5 dated Mar. 10, 2022.

* cited by examiner

CASING HOLDING DEVICE FOR AN APPARATUS FOR FILLING TUBULAR CASES

TECHNICAL FIELD

The present invention concerns a casing holding device for an apparatus for filling tubular cases with a pasty foodstuff material, comprising a casing brake which in operation in a portioning position is in contact with a case drawn on to a filling tube and produces a pressing force between case and filling tube, a movable holding portion for holding the casing brake, and an adjusting device for moving the casing brake between the portioning position and a casing change position in which the casing brake is uncoupled from the filling tube.

BACKGROUND

Casing holding devices are known from the state of the art in connection with so-called filling machines and are used when filling tubular cases with a pasty foodstuff material like for example sausagemeat or the like. The cases to be filled with the foodstuff material are successively drawn on to a filling tube of a filling apparatus or machine. The casing holding device is brought into contact with the free end of the filling tube which is fitted with the case. In operation, in particular in a portioning position, the casing holding device is in contact with its casing brake with a gathered case (also referred to as the gathered sausage casing) which has been drawn on to the filling tube, which produces a pressing force between the case and the filling tube. When filling the case which can be a natural or artificial casing therefore this arrangement thus provides that the case portion is controlledly pulled off.

During the filling operation the case is thus held tautly, whereby inter alia a uniform degree of filling of the case can be achieved.

The casing brake surrounds the free end of the filling tube and thus also the case which is drawn on to the filling tube. After the case is filled a case change is necessary, that is to say a fresh gathered case is drawn on to the filling tube, in which case the casing brake is usually moved out of the portioning position at the end of the filling tube into a casing change position. In the casing change position the filling tube is accessible for pulling on a fresh tubular case. To be able to move the casing brake into the casing change position the casing holding device further has an adjusting device for moving the casing brake or a holding portion receiving the casing brake from the portioning position into the casing change position.

DE 10 2007 061 119 A1 discloses for example a casing holding device having a casing brake. The casing brake is carried on a support member arranged pivotably on a cantilever arm extending substantially parallel to the filling tube. In the movement from the portioning position into the casing change position the casing brake performs exclusively a pivotal movement with a uniform radius.

EP 2 227 963 B2 discloses a holding apparatus having a casing brake, wherein the casing brake is brought into contact with the free end of a filling tube and holds a gathered casing under tension during the operation of filling it with sausagemeat. A holding portion carrying the casing brake is mounted movably by means of a sliding guide, by means of which the casing brake is firstly moved in the axial direction of the filling tube and then pivoted out of the longitudinal axis of the filling tube. Sliding guides frequently involve major friction.

SUMMARY

The object of the present invention is to provide a casing holding device and a filling apparatus for tubular cases, by means of which the movement of the casing brake between the portioning position and the casing change position is further simplified.

In a casing holding device for an apparatus for filling tubular cases with a pasty foodstuff material the object of the invention is attained with the features of claim 1. In particular the adjusting device has a guide linkage which has a plurality of links and which is adapted for the casing brake in at least a first phase of the movement out of the portioning position into the casing change position to be moved substantially axially relative to the longitudinal axis of the filling tube and to be pivoted in at least a second phase of the movement relative to the longitudinal axis of the filling tube.

The invention by means of the guide linkage having a plurality of links pursues the approach of permitting a simplified movement of the casing brake from the portioning position into the casing change position. In particular the guide linkage having a plurality of links provides that a reduced force and thus reduced energy is necessary in manual actuation of the casing holding device to transfer the casing brake and in particular the components of the casing holding device, that carry the casing brake, from the portioning position into the casing change position, for the frictional forces are low in accordance with the invention. By means of the multi-link guide linkage in the first phase of the movement the holding portion is displaced with the casing brake substantially axially relative to the longitudinal axis of the filling tube and in a second phase of the movement the filling tube is pivoted out of the longitudinal axis of the filling tube. The sequence of movements is precisely guided and can be quickly carried out with a low level of effort.

In the present case the movement of the casing brake out of the portioning position into the casing change position defines an uncoupling movement. The return movement of the casing brake from the casing change position into the portioning position defines a coupling movement. With the guide linkage which is in accordance with the invention and has a plurality of links both a simplified uncoupling movement and also a simplified coupling movement of the casing brake from and to the filling tube is possible. In the case of the coupling movement implemented by means of the guide linkage the casing brake, in contrast to the uncoupling movement, in the second phase of the coupling movement, is moved substantially axially relative to the longitudinal axis of the filling tube and is thus preferably brought again into contact with or bears against a case drawn on to the filling tube.

A preferred development of the casing holding device according to the invention provides that the guide linkage having a plurality of links is in the form of a four-link linkage adapted to move the casing brake on a predetermined curved path with a substantially straight path portion and a curved path portion. With the provision of a four-link linkage, also referred to as a four-link mechanism, this provides a guide linkage of a simple configuration. The four-link linkage permits a movement of the casing brake on a preferably predetermined fixed path. Preferably the four-link linkage has four rotary joints which have at least one degree of freedom. Preferably the curved path on which the casing brake is moved has two path portions with radii of movement of differing sizes. The substantially rectilinear path portion, on the first 20 to 40 mm of the uncoupling movement (during the coupling movement this is the last 20 to 40 mm) has a radius of movement of greater than 2500 mm, preferably about 3500 mm. During the movement of the casing brake relative to the filling tube along the first rectilinear path portion there is therefore only a slight lateral displacement relative to the longitudinal axis of the filling tube, whereby detrimental deformation of the filling tube end is avoided when pulling the casing brake off and pushing it on to the filling tube.

Preferably the guide linkage having a plurality of links has at least one stationary frame, two crank arms which are respectively movably pivoted to the frame by way of a rotary joint and a coupling portion connecting the crank arms by way of two further rotary joints. Preferably provided on the casing holding device is a first and a second stationarily arranged rotary joint, with which the two movably pivotably connected crank arms are connected. The spacing between the first and second stationarily arranged rotary joints is invariable. The two movably pivotably connected crank arms are also connected together by way of a coupling portion, wherein the coupling portion is fixed to the movable crank arms by way of a third and a fourth rotary joint. That provides for mobility of the guide linkage along a predetermined curved path. Preferably the four rotary joints each have only one degree of freedom whereby the casing brake or a holding portion carrying the casing brake is movable in a fixed plane on a predetermined level.

A preferred development of the casing holding device according to the invention provides that the casing brake, preferably a movable holding portion carrying the casing brake, is fixedly connected to the coupling portion of the four-link linkage. That ensures the greatest possible freedom of movement of the casing brake or the holding portion carrying the casing brake. In the present case the spacings between the stationary rotary joints and the lengths of the crank arms pivotably mounted to the stationary rotary joints and the coupling portion connecting the crank arms together by way of rotary joints are matched to each other and the frame of the guide linkage according to the invention is so oriented relative to the filling tube that the casing brake in the first phase of the uncoupling movement and the second phase of the coupling movement is moved substantially axially relative to the longitudinal axis of the filling tube.

According to a preferred development the adjusting device has a lever mechanism connected to the guide linkage as an actuating unit for the guide linkage. By means of the lever mechanism according to the invention it is possible for the application of force for actuating the guide linkage to be further reduced, whereby handleability of the holding device according to the invention during the casing change operation is further improved. In addition the casing holding device according to the invention can preferably be actuated by hand or manually. In that way the involvement of control technology on a filling apparatus for filling tubular cases is reduced by means of such a casing holding device according to the invention.

Preferably the lever mechanism is connected to one of the crank arms or the coupling portion of the guide linkage. The movable coupling provides that the lever mechanism can be actuated almost independently of the curved path predetermined by the guide linkage. Preferably the lever mechanism engages the coupling portion or the movable end of one of the crank arms. This provides for a preferably efficient conversion of the actuating force acting at the lever mechanism into the adjusting force acting on the guide linkage.

Preferably the lever mechanism has two movably interconnected lever arms, wherein a first lever arm is arranged with one end pivotably at a stationary rotary mounting and the second lever arm is connected with its free end rotatably to the coupling portion. The design configuration of the lever mechanism with two movably interconnected lever arms affords the advantage that it is possible to act on the guide linkage with a lever action which boosts the actuating force. In addition with the displacement of the guide linkage by way of the lever arms, a change in spacing which occurs in relation to the stationary rotary mounting of the lever mechanism as the point of application for the actuating force can be easily compensated. Further preferably it is possible to produce an advantageously acting transmission ratio by means of the movably interconnected lever arms of the lever mechanism and the crank arms of the guide linkage. Preferably the lever mechanism and the guide linkage co-operate in such a way that they are adapted to provide an irregular transmission ratio with a non-linear conversion function. Accordingly, when the actuating movement at the lever mechanism is subdivided into length or angle portions of the same magnitude, the casing brake performs movements of differing size along the successive actuating portions.

Preferably moreover the lever mechanism according to the invention can provide for advantageous conversion of an actuating force which occurs in the form of a rotary movement into a substantially translatory force at the output side of the lever mechanism. According to a preferred configuration of the casing holding device according to the invention the lever mechanism is rotationally coupled at its drive side to a manually actuable hand lever. Preferably the manually actuable hand lever is coupled directly or indirectly to the lever mechanism by way of the stationary rotary mounting of the lever mechanism. Preferably the one end of the hand lever is mounted rotatably. For displacement of the lever mechanism the hand lever is preferably pivoted in a horizontally extending plane through a predetermined angle.

A further configuration of the holding device provides that a toggle lever clamp is provided by means of the lever mechanism for arresting the guide linkage in the portioning position of the casing brake on the filling tube. By means of the toggle lever clamp it is preferably provided that the casing brake does not independently move out of its portioning position on the filling tube. It is therefore possible to dispense with a separate arresting device, with which the casing brake or the holding portion carrying the casing brake is fixed relative to the holding device. Accordingly arresting of the holding device according to the invention is effected automatically with the movement of the casing brake into the portioning position. Removal of the arresting action is achieved by moving the casing brake out of the portioning position in the direction of the casing change position. Preferably the lever arms of the toggle lever mechanism are oriented or associated with each other in such a way that at the beginning of the uncoupling movement and at the end of the coupling movement they are moved beyond a dead centre point acting between the two lever arms of the lever mechanism by the longitudinal axes of the lever arms being briefly oriented in mutually coincident relationship. In addition the lever arms in their dead centre point position have a slight lengthwise displacement relative to each other, by which a counteracting force which is to be overcome when passing through the dead centre point position is generated.

That counteracting force at the same time forms the arresting force for holding the guide linkage in the portioning position of the casing brake.

According to a preferred development a step-up transmission, preferably a spur gear transmission, is interposed between the lever mechanism and the hand lever. The step-up transmission preferably effects transmission of the actuating force at the hand lever into an adjusting force acting on the lever mechanism. In the present case moreover the step-up transmission provides for a change in the direction of movement from the hand lever on to the at least one lever arm of the lever mechanism. The latter then performs a pivotal movement which in each case is in opposite relationship to the pivotal movement of the hand lever. Preferably a single-stage spur gear transmission having two spur gears is used. The drive side spur gear is coupled non-rotatably to the rotatably mounted end of the hand lever and the driven spur gear is non-rotatably connected to the drive lever of the lever mechanism.

Preferably the casing holding device has a holding portion with a cantilever arm and a head plate for the casing brake, the head plate extending in the portioning position approximately perpendicularly to the cantilever arm. The cantilever arm and the head plate extending perpendicularly thereto provide a support structure for the casing brake which is preferably carried rotatably at the head plate. The holding portion is intended to ensure that the casing brake is arranged with its receiving opening preferably coaxially with the longitudinal axis of the filling tube. In an embodiment of the present invention the entire cantilever arm with the head plate arranged thereon is carried movably by means of the guide linkage. Preferably the cantilever arm of the casing holding device can be coupled to a twist-off transmission of an apparatus for filling tubular cases, by means of which the casing brake is driven preferably in cyclically controlled fashion. Arranged on the cantilever arm and the head plate are transmission means for a drive movement to be transmitted from the twist-off drive in the direction of the casing brake.

In a preferred configuration of the casing holding device the guide linkage is arranged in a coupling region of a cantilever arm which has a first stationary arm portion and a second arm portion movable relative to the first arm portion by means of the guide linkage. Instead of moving the entire cantilever arm by means of the head plate disposed at the end of the cantilever arm it is provided according to the invention that only one portion, namely a movable second portion, is moved relative to a first fixed arm portion of the cantilever arm. In that way the support forces to be carried on the part of the guide linkage are reduced. In addition arranging the guide linkage along a portion of the cantilever arm permits a simplified configuration for a coupling region between the arm portions of the cantilever arm, that are to be brought into contact with each other. Furthermore arranging the transmission means of the twist-off drive at the cantilever arms for transmission of the drive movement in the direction of the casing brake is simplified. Preferably the coupling region is provided on about half of the cantilever arm.

For transmission of the drive movement from the twist-off drive in the direction of the casing brake provided at mutually facing ends of first and second arm portions is a respective coupling part, by means of which preferably a plug coupling is provided for transmission of a drive movement to the casing brake preferably mounted movably to the holding portion. The coupling parts at the first and second arm portions, when the coupling parts are in contact with each other and thus the casing brake is in the portioning position, preferably have interengaging positively locking elements which prevent a relative movement in the peripheral direction of the coupling parts relative to each other. Preferably they allow a relative movement of the coupling parts in the axial direction. Preferably the positively locking elements of the coupling parts, that are in engagement with each other in the portioning position, are in the form of a Hirth serration. That provides that the positively locking elements can be brought into and out of engagement with each other in a simplified fashion.

In a further aspect the invention concerns a casing holding device as set forth in the classifying portion of claim 1. According to the invention it is provided that the adjusting device is adapted to be manually actuable for movement of the casing brake and has a guide linkage which has a plurality of links and which is adapted to move the casing brake at least substantially axially relative to the longitudinal axis of the filling tube in at least a first phase of a movement from the portioning position into the casing change position. The invention here adopts the approach that provided at a casing holding device having an adjusting device which is actuable manually or by hand is a guide linkage having a plurality of links, by means of which the casing brake, in the uncoupling movement, that is to say while the casing brake is being brought out of engagement with the filling tube, performs a preferably substantially axial movement. In that way damage to the filling tube and the casing brake is avoided when uncoupling the casing brake from the filling tube or to the tubular case which is freshly drawn on to the filling tube when the casing brake and the filling tube are brought into engagement again. In the present case the term guide linkage having a plurality of links is not used to denote a pure guide device having a guide portion guided along guide surfaces. In the present case the term guide linkage is a coupling linkage having a plurality of mutually co-operating connecting elements which are connected by way of a plurality of and at least four link points, in the present case four rotary joints.

According to the invention the casing brake, in at least one second phase of the movement that follows the first phase of the movement and by means of which the casing brake is transferred out of the portioning position into a casing change position performs a pivotal movement relative to the longitudinal axis of the filling tube.

According to a further aspect the present invention concerns an apparatus for filling tubular cases with a pasty material, in particular gathered skin casings with sausagemeat, comprising at least one filling tube, on to which a case which can be filled with the material can be drawn, wherein an end is mounted to a receiving portion preferably rotatable and drivable about its longitudinal axis, and a casing holding device according to one of the above-preferred embodiments, which is associated with the free end of the filling tube.

The apparatus according to the invention for filling tubular cases, also referred to as a filling machine, attains the object set forth in the opening part of this specification with a casing holding device designed according to the invention, which in operation of the apparatus, with its casing brake in at least a first phase of an uncoupling movement, that is to say when the casing brake is transferred from its portioning position into the casing change position, performs a substantially axial movement relative to the longitudinal axis of the filling tube. By the casing brake being moved in the axial direction relative to the longitudinal axis of the filling tube as long as the casing brake is in engagement with the filling tube damage to the casing brake and the filling tube is preferably avoided. In that respect, in the present case the term a substantially axial movement of the casing brake is also used to denote a movement along the longitudinal axis of the filling tube which deviates slightly from an idealised axial movement along the filling tube. Preferably it is to be ensured that, with the casing brake which is to be uncoupled from the filling tube, or during the coupling movement which takes place after the casing change in respect of the casing brake in the direction of the filling tube, an excessive displacement movement of the casing brake perpendicularly to the longitudinal axis of the filling tube is avoided.

Preferably the filling tube of the apparatus according to the invention is adapted to be drivable, whereby, with the casing brake also being drivable, a plurality of twist-off locations are produced with filling of the case successively along the filled case and thus the filled tubular case is subdivided into individual sausage portions at predetermined intervals.

According to a preferred configuration the apparatus according to the invention has a frame structure on which the casing holding device is arranged, preferably by means of a holding portion of the casing holding device. The frame structure forms the basic structure of the filling apparatus according to the invention, on which preferably the essential components of the apparatus like also the casing holding device are disposed. According to a preferred embodiment the holding portion has a cantilever arm oriented substantially parallel to the filling tube. In addition the cantilever arm is of a length approximately corresponding to the length of the rotatable or drivable filling tube on the filling machine. Arranged at the end of the cantilever arm is the head plate with the casing brake accommodated rotatably therein. The head plate preferably extends perpendicularly to the cantilever arm of the holding device according to the invention and to the filling tube of the filling apparatus.

In a preferred development of the filling apparatus according to the invention it further includes a twisting-off device for driving the casing brake, and/or a filling hopper for receiving the pasty material, and/or a conveyor pump for conveying the pasty material. The twist-off device is preferably arranged on the frame structure in the attachment region of the cantilever arm of the holding device according to the invention. The twist-off device drives the casing brake by way of a drive train suitably provided on the cantilever arm and the head plate. Preferably as the drive train the cantilever arm has a drive shaft rotatably accommodated in the interior of the cantilever arm. Provided on the head plate is a belt drive coupled to the rotatably arranged casing brake. The axes of rotation of the casing brake and the drive shaft portion arranged on the pivotable cantilever arm of the casing holding device preferably extend in mutually parallel relationship. The filling hopper on the filling machine forms a receiving reservoir or an intermediate storage means for a meat material to be processed. The filling hopper is fluid-conductingly coupled to a downstream-disposed conveyor pump, by means of which the pasty foodstuff material introduced into the filling hopper is passed in the direction of the filling tube of the filling machine. Preferably as its conveyor pump the filling machine has a screw pump, a double-spindle pump, a gear pump or a vane pump for conveying the foodstuff material. By means of the conveyor pump the foodstuff material can be conveyed substantially continuously, cyclically or oscillatingly in the direction of the filling tube.

The preferred embodiments or developments described in relation to the casing holding device according to the invention are at the same time also preferred embodiments of the apparatus according to the invention for filling tubular cases. Preferred embodiments described in relation to the filling apparatus are at the same time also preferred embodiments of the casing holding device according to the invention insofar as they are not inherently contradictory.

BRIEF DESCRIPTION OF THE DRAWINGS

The invention is described in greater detail hereinafter by means of a preferred embodiment with reference to the accompanying Figures in which.

DETAILED DESCRIPTION

Figure 1:
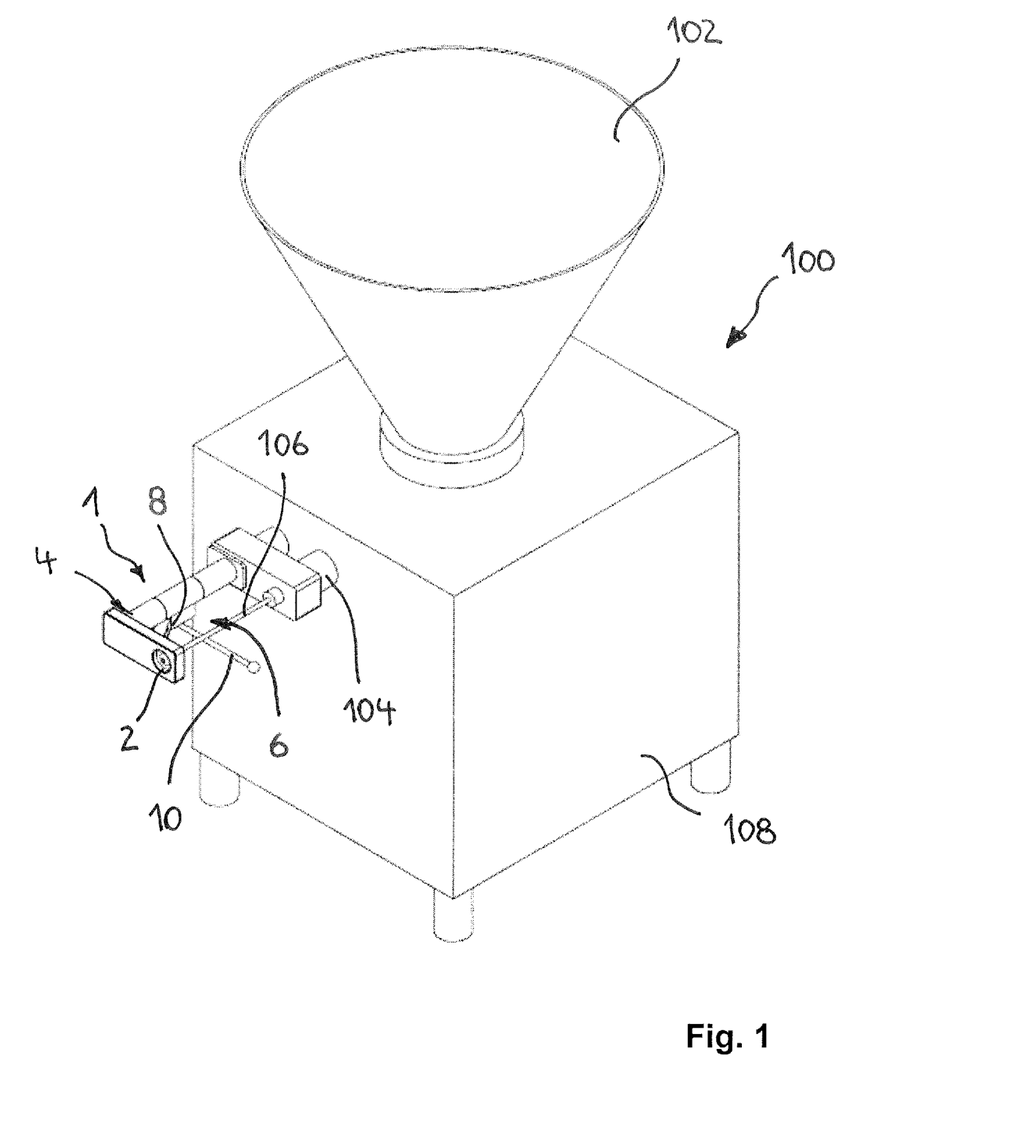
FIG. 1 shows a perspective view of a filling apparatus or filling machine for producing a string consisting of a foodstuff material with a casing holding device according to the invention.

FIG. 1 shows a machine for producing a string consisting of a foodstuff material, in particular a filling machine 100 for filling tubular cases like for example synthetic and/or natural sausage skins. Provided on the filling machine 100 is a filling hopper 102 for introducing the foodstuff material to be processed. A conveyor pump (not shown in detail) is arranged within the filling machine 100. The material to be processed is conveyed by means of the conveyor pump in the direction of an extrusion head 104 and a filling tube 106 arranged rotatably on the extrusion head.

Arranged on the filling machine 100 is a casing holding device 1 including a casing brake 2 which in operation of the filling machine 100 is in contact with a case drawn on to the filling tube 106, and produces a pressing force between the case and the filling tube. The casing brake 2 is carried by way of a holding portion 4, by means of which the casing brake 2 is held in a predetermined orientation relative to the filling tube 106. The casing holding device 1 further includes an adjusting device 6 for moving the casing brake 2. The adjusting device 6 is adapted to move the casing brake between its portioning position at the end of the filling tube 106 and a casing change position in which the casing brake 2 is uncoupled from the filling tube 106, along a predetermined path. The adjusting device 6 includes a guide linkage 8 (see FIG. 2) which has a plurality of links and by means of which the casing brake 2 is moved in at least a first phase of a movement out of the portioning position into the casing change position substantially axially relative to the longitudinal axis of the filling tube, and is pivoted in at least a second phase of the movement relative to the longitudinal axis of the filling tube.

The guide linkage 8 in the embodiment illustrated here is actuated by means of a handle 10. The handle 10 in the present embodiment is in the form of a hand lever. In particular after a case which has been drawn on to the filling tube 106 and which can be filled has been processed the casing brake 2 is moved out of contact with the filling tube by means of the hand lever 10 in order to push a fresh gathered case on to the filling tube 106 for filling thereof.

Figure 2:
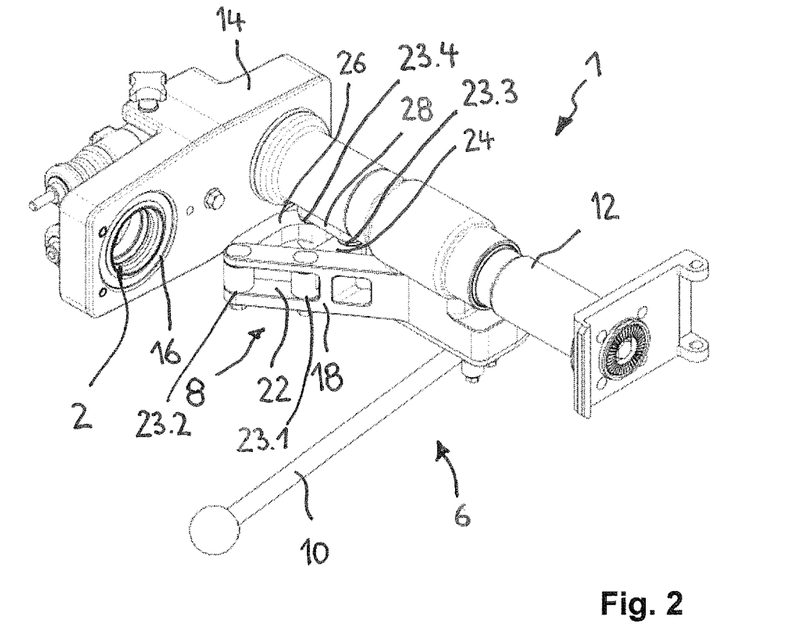
FIG. 2 shows a perspective view of the casing holding device according to the invention as shown in FIG. 1, FIGS. 3 and 4 show views of the casing holding device in various operating positions with respect to a filling tube of the filling apparatus.

FIG. 2 shows the casing holding device 1 according to the invention with its adjusting device 6 as a detail view, thereby to illustrate the mode of operation thereof more clearly. The holding portion 4 with the casing brake 2 which in particular is carried rotatably thereon has a cantilever arm 12 extending preferably parallel to the longitudinal axis of the filling tube 106. Arranged at the free end of the cantilever arm 12 is a head plate 14 extending approximately perpendicularly to the cantilever arm. Provided on the head plate 14 is a rotary mounting 16 for the casing brake carried movably thereon. The casing holding device 1 is arranged with its cantilever arm 12 on a frame structure 108 of the filling machine 100. The filling machine 100 has a twist-off device (not shown in detail) for driving the casing brake 2.

Figure 6:
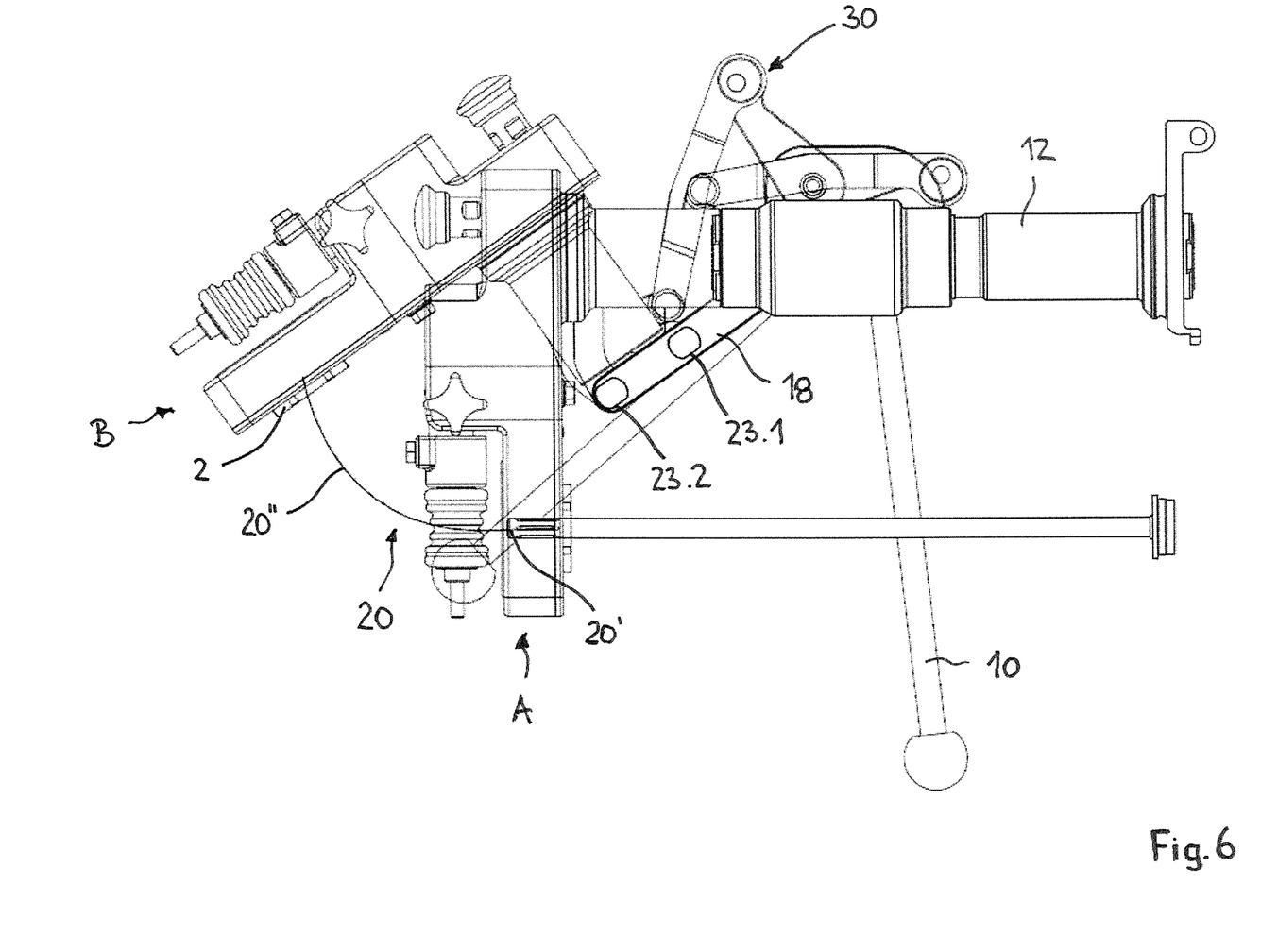
FIG. 6 shows a superimposed view of the dividing apparatus for representing the curved path implemented by means of the guide linkage according to the invention.

As can further be seen from FIG. 2 the guide linkage 8 is in the form of a multi-link linkage, in particular a four-link linkage 18. The four-link linkage 18 is adapted to move the casing brake 2 between the portioning position A and the casing change position B on a predetermined curved path 20 (FIG. 6). The curved path 20 shown in FIG. 6 includes a substantially rectilinear path portion 20' and a curved path portion 20". The guide linkage 8, in the present case the four-link linkage 18, includes at least one stationary frame 22, two crank arms 24, 26 pivotably movably connected to the frame by way of a first and a second rotary joint 23.1, 23.2 and a coupling portion 28 connected to one of the crank arms 24, 26 by way of a third and a fourth rotary joint 23.3, 23.4. The casing brake 2, in particular a part of the holding portion 4 for the casing brake 2, is fixedly connected to the coupling portion 28 of the four-link linkage 18. The linkage 18 with its four rotary joints 23.1-23.4 is actuated manually by means of the handle 10. Upon actuation of the hand lever 10 a portion of the cantilever arm 12, the head plate 14 and the casing brake 2 perform a substantially translatory movement in the first phase of movement. It is only in the second phase of movement that the casing brake 2 is pivoted by means of the crank arms 24, 26 inclined at an angle relative to the longitudinal axis of the filling tube 106.

Figure 3:
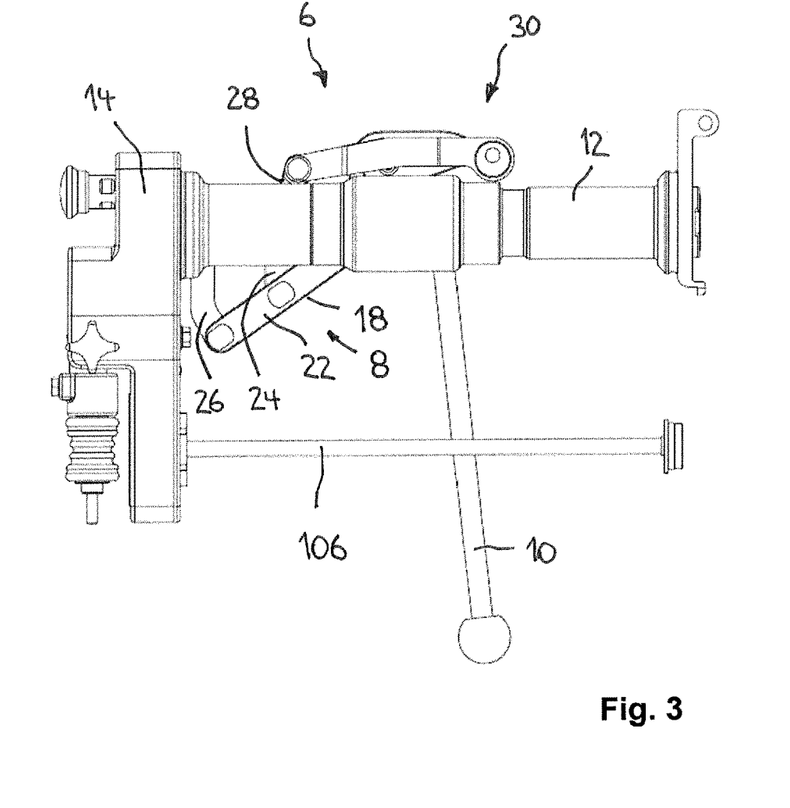
Figure 4:
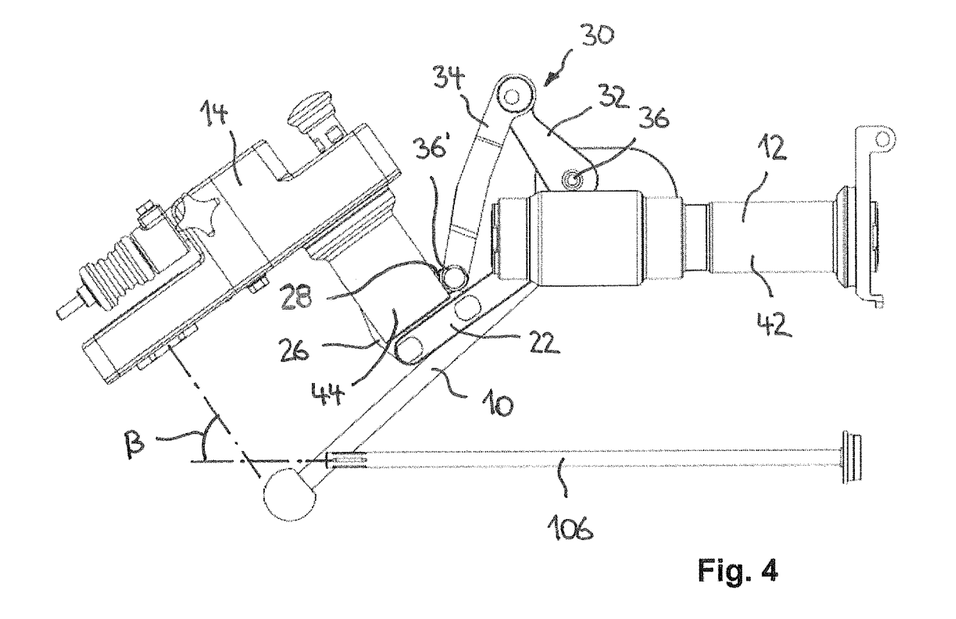

As FIGS. 3 and 4 further show the adjusting device 6 has a lever mechanism 30 which is connected to the guide linkage 8 and which is interposed between the guide linkage 8 and the hand lever 10 of the adjusting device 6 as a kind of step-up transmission. The lever mechanism 30 represents a drive connection between the hand lever 10 and the movable crank arms 24, 26 or the coupling portion 28 of the guide linkage 8. As FIG. 4 shows the lever mechanism 30 has two lever arms 32, 34 movably connected together. A first lever arm 32 is arranged with an end at a stationary rotary mounting 36 and is supported pivotably in particular by way of the rotary mounting 36. The second lever arm 34 is coupled with one of its ends rotatably to the first lever arm 32 and with the opposite end is pivotably connected movably at a further rotary mounting 36' on the coupling portion 28.

In the embodiment illustrated here a toggle lever clamp is provided by means of the lever mechanism 30, thereby providing a self-locking function for the adjusting device 6. Accordingly the casing brake 2 is automatically arrested or fixed on the filling tube 6 by the guide linkage 8 in the portioning position A (FIG. 3). The casing brake can therefore not move of its own accord out of the portioning position A on the filling tube 106. In the illustrated embodiment the toggle lever clamp acts against an abutment on the adjusting device 6. In an embodiment which is not shown here a transmission in the form of a spur gear transmission is used for the transmission of force between the lever mechanism 30 and the hand lever 10. The spur gear transmission serves for the simplified transmission of force and in the present case involves a change in the direction of movement between the hand lever 10 and the first lever arm 32 of the lever mechanism 30, which are pivoted in opposite directions. Preferably as shown in FIG. 4 the central axis of the casing brake 2 is at a set angle β in the region of about 30° to 70° relative to the longitudinal axis of the filling tube 106 in the casing change position.

Figure 5:
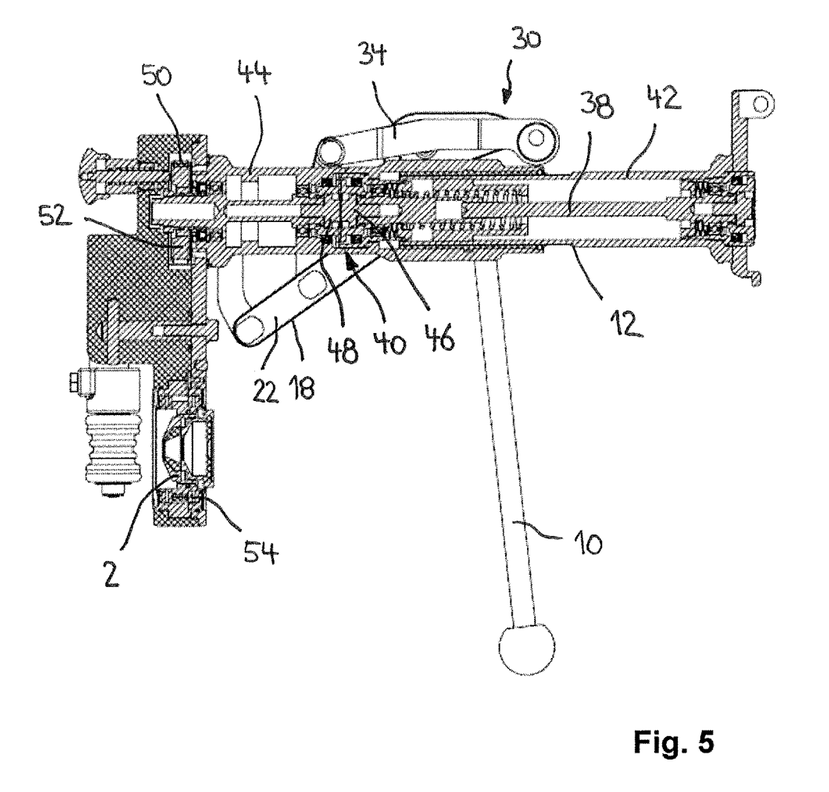
FIG. 5 shows a sectional view of the casing holding device according to the invention.

FIG. 5 shows a sectional view of the casing holding device 1 according to the invention, which shows the two-part configuration of the cantilever arm 12 and the arrangement of a drive train 38 for implementing the twisting-off movement at the casing brake 2 within the cantilever arm 12. The cantilever arm 12 has a coupling region 40, by means of which the cantilever arm 12 is subdivided into a stationary first arm portion 42 and a movable second arm portion 44. The drive train 38 extends in the form of a drive shaft along the cantilever arm 12. Provided in the coupling region 40 of the cantilever arm 12 are two coupling parts 46, 48 which can be brought into engagement with each other and which subdivide and couple the drive train 38.

In an embodiment not shown here the coupling parts 46, 48 at their mutually facing ends have interengaging latching elements to provide a positively locking connection between the coupling parts 46, 48. A kind of plug coupling is produced by means of the coupling parts 46, 48. In the embodiment shown here at least one of the coupling parts 46, 48 is arranged displaceably in the axial direction within the first or second arm portion of the cantilever arm. This provides a compensating movement upon coupling and uncoupling of the coupling parts 46, 48. In the illustrated embodiment transmission of the drive movement from the drive train 38 to the casing brake 2 is effected by means of a drive belt 50 which is guided over a belt pulley 52 on the drive train 38 and a drive pulley 54 on the casing brake 2.

FIG. 6 shows the various operating positions of the casing holding device in mutually coincident relationship, namely the portioning position A in which the casing brake co-operates with the free end of the filling tube 106 and the casing change position B in which the casing brake is uncoupled from the filling tube 106. The Figure also shows the curved path 20 of the casing brake 2, which can be produced by means of the guide linkage, with its substantially rectilinear path portion 20' and the curved path portion 20" of the casing brake 2.

LIST OF REFERENCES

1 casing holding device
2 casing brake
4 holding portion
6 adjusting device
8 guide linkage
10 handle
12 cantilever arm
14 head plate
16 rotary mounting
18 four-link linkage
20 curved path
20', 20" path portion
22 frame
23.1 first rotary joint
23.2 second rotary joint
23.3 third rotary joint
23.4 fourth rotary joint 24, 26 crank arm
28 coupling portion
30 lever mechanism
32, 34 lever arm
36 rotary mounting
38 drive train
40 coupling region
42, 44 arm portion
46, 48 coupling part
50 drive belt
52, 54 pulley
100 filling machine
102 filling hopper
104 extrusion head
106 filling tube
108 frame structure
A portioning position
B casing change position

The invention claimed is:

1. A casing holding device for an apparatus for filling a case with a pasty foodstuff material, the casing holding device comprising
    a casing brake having a portioning position in which the casing brake is placed in contact with the case drawn onto a filling tube and produces a pressing force between the case and the filling tube; and
    an adjusting device for moving the casing brake between the portioning position and a casing change position in which the casing brake is uncoupled from the filling tube, the adjusting device having a guide linkage which has a plurality of links and which is adapted for the casing brake, in at least a first phase of the movement out of the portioning position into the casing change position, to be moved substantially axially relative to a longitudinal axis of the filling tube and to be pivoted in at least a second phase of the movement relative to the longitudinal axis of the filling tube.

2. The casing holding device of claim 1 wherein the guide linkage comprises a four-link linkage adapted to move the casing brake on a predetermined curved path with a substantially straight path portion and a curved path portion.

3. The casing holding device of claim 2 wherein the guide linkage includes a stationary frame, a first rotary joint, a second rotary joint, a third rotary joint, a first crank arm and a second crank arm that are respectively movably pivoted to the stationary frame by the first rotary joint, and a coupling portion connecting the first crank arm and the second crank arm respectively with the second rotary joint and the third rotary joint.

4. The casing holding device of claim 3 further comprising:
    a holding portion mounted to the casing brake, the casing brake fixedly connected to the coupling portion of the four-link linkage by the holding portion.

5. The casing holding device of claim 4 wherein the holding portion has a cantilever arm and a head plate for the casing brake, the head plate extending in the portioning position approximately perpendicularly to the cantilever arm.

6. The casing holding device of claim 4 wherein the guide linkage is arranged in a coupling region of a cantilever arm which has a first stationary arm portion and a second arm portion movable relative to the first stationary arm portion by means of the guide linkage.

7. The casing holding device of claim 6 wherein a respective coupling part is provided at mutually facing ends of first and second arm portions, and each coupling part includes a plug coupling provided for transmission of a drive movement to the casing brake mounted to the holding portion.

8. The casing holding device of claim 3 wherein the adjusting device has a lever mechanism connected to the guide linkage as an actuating unit for the guide linkage.

9. The casing holding device of claim 8 wherein the lever mechanism is connected to the first crank arm, the second crank arm, or the coupling portion of the guide linkage.

10. The casing holding device of claim 8 wherein the lever mechanism has a first lever arm and a second lever arm that are movably interconnected, the first lever arm is arranged with one end pivotably at a stationary rotary mounting, and the second lever arm is connected with its free end rotatably to the coupling portion.

11. The casing holding device of claim 8 further comprising:
    a manually actuable hand lever,
    wherein the lever mechanism is rotationally coupled at its drive side to the manually actuable hand lever.

12. The casing holding device of claim 11 wherein the lever mechanism includes a toggle lever clamp for arresting the guide linkage in the portioning position of the casing brake on the filling tube.

13. The casing holding device of claim 12 further comprising:
    a spur gear transmission arranged between the lever mechanism and the manually actuable hand lever.

14. The casing holding device of claim 1 wherein the adjusting device is adapted to be manually actuable for movement of the casing brake, and the guide linkage is adapted to move the casing brake at least substantially axially relative to the longitudinal axis of the filling tube.

15. An apparatus for filling a case with a pasty material, the apparatus comprising
    a filling tube on to which the case can be drawn, the filling tube being mounted drivably and rotatably about a longitudinal axis; and
    a casing holding device including a casing brake and an adjusting device, the casing brake having a portioning position in which the casing brake is placed in contact with the case drawn onto the filling tube and produces a pressing force between the case and the filling tube, the adjusting device for moving the casing brake between the portioning position and a casing change position in which the casing brake is uncoupled from the filling tube, the adjusting device having a guide linkage which has a plurality of links and which is adapted for the casing brake, in at least a first phase of the movement out of the portioning position into the casing change position, to be moved substantially axially relative to the longitudinal axis of the filling tube and to be pivoted in at least a second phase of the movement relative to the longitudinal axis of the filling tube.

16. The apparatus of claim 15 further comprising:
    a frame structure; and
    a cantilever arm coupling the casing holding device to the frame structure.

17. The apparatus of claim 16 wherein the cantilever arm is oriented approximately parallel to the filling tube.

18. The apparatus of claim 15 further comprising:
    a twisting-off device for driving the casing brake; and/or
    a filling hopper for receiving the pasty material; and/or
    a conveyor pump for conveying the pasty material.

* * * * *